United States Patent [19]
Martin

[11] 3,768,759
[45] Oct. 30, 1973

[54] MECHANISM FOR THE EMERGENCY OPENING OR JETTISONING OF THE HOODS OR CANOPIES OF VEHICLES

[76] Inventor: James Martin, Southlands Manor, Southlands Rd., Denham, Near Uxbridge, England

[22] Filed: Aug. 21, 1970

[21] Appl. No.: 65,805

[30] Foreign Application Priority Data
Oct. 13, 1969 Great Britain.................. 50,249/69
Nov. 24, 1969 Great Britain.................. 57,435/69

[52] U.S. Cl. ............................................. 244/121
[51] Int. Cl. ............................................. B64c 1/14
[58] Field of Search........................... 244/121, 122

[56] References Cited
UNITED STATES PATENTS
2,937,829  5/1960  Martin ............................. 244/121
2,970,793  2/1961  Beem et al..................... 244/122.17
2,998,212  8/1961  Rogers............................... 244/121
3,487,445  12/1969  Gluhareff et al............. 244/122 AD
3,547,382  12/1970  Stanley .............................. 244/121

Primary Examiner—Milton Buchler
Assistant Examiner—Gregory W. O'Connor
Attorney—Kurt Kelman

[57] ABSTRACT

The invention concerns the emergency opening or jettisoning of a vehicle cockpit canopy, in particular an aircraft cockpit canopy, by the use of at least one rocket motor to thrust quickly the canopy away from its cockpit closing position.

23 Claims, 12 Drawing Figures

Patented Oct. 30, 1973

Inventor
JAMES MARTIN

By Kurt Kelman
AGENT

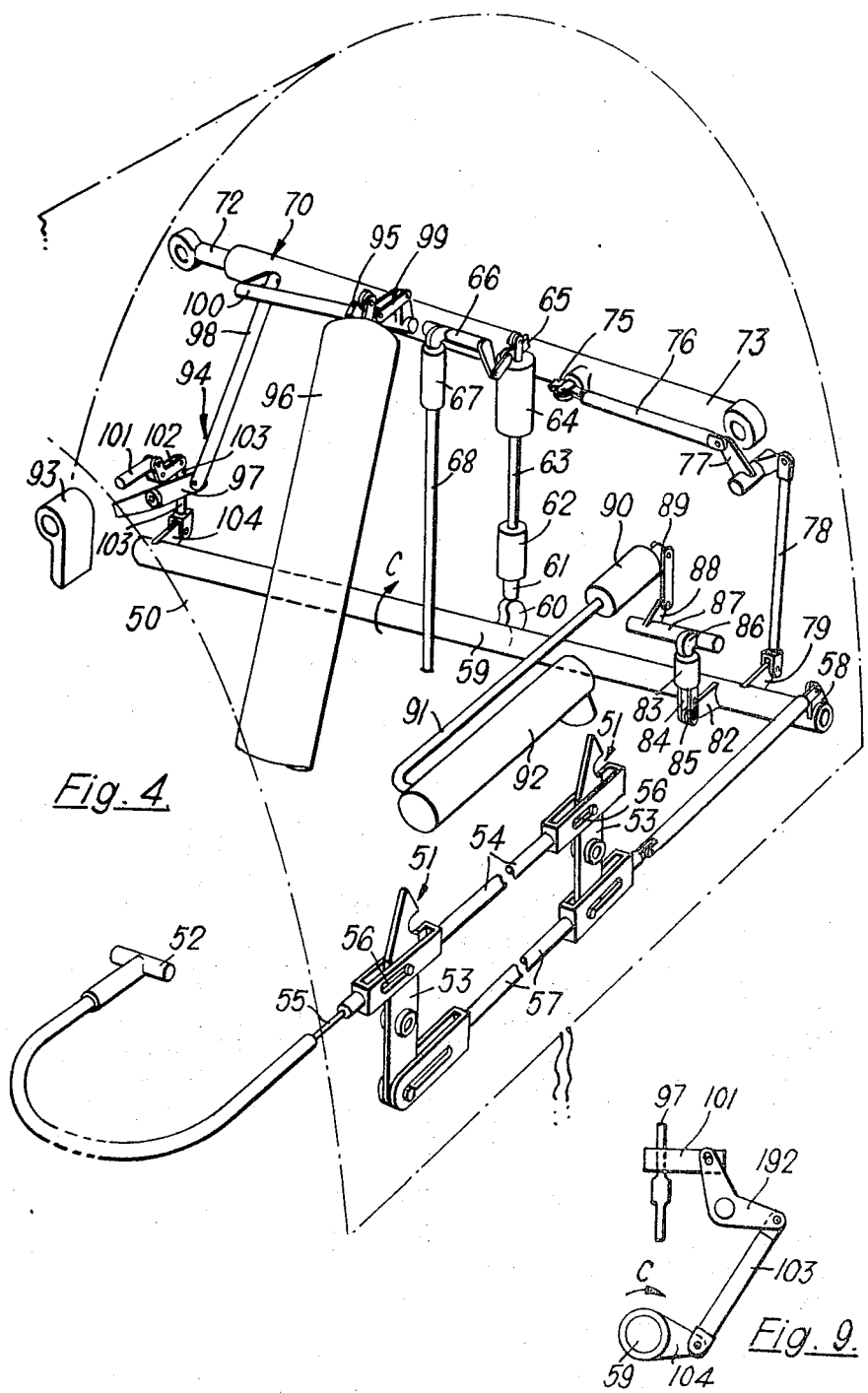

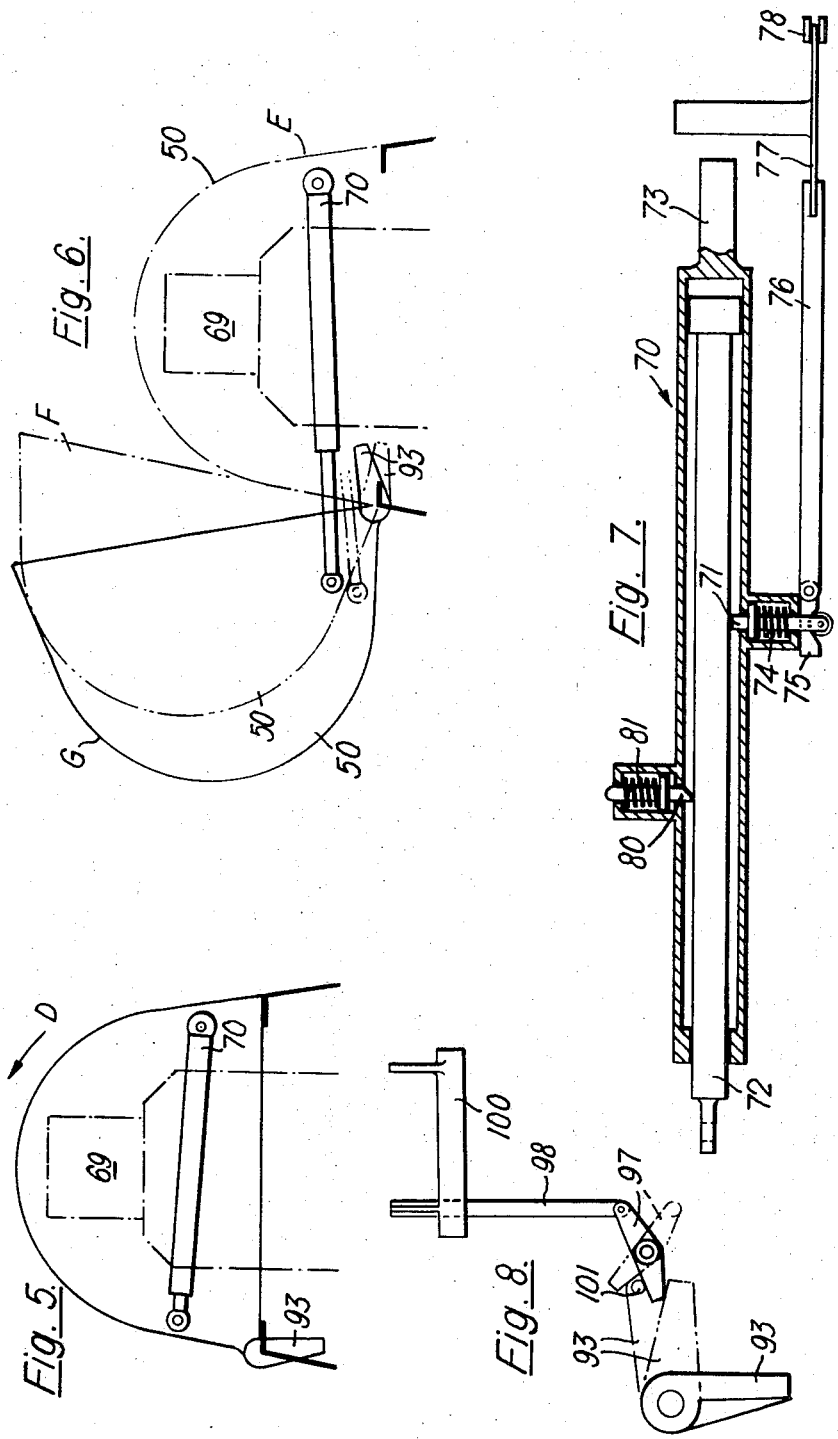

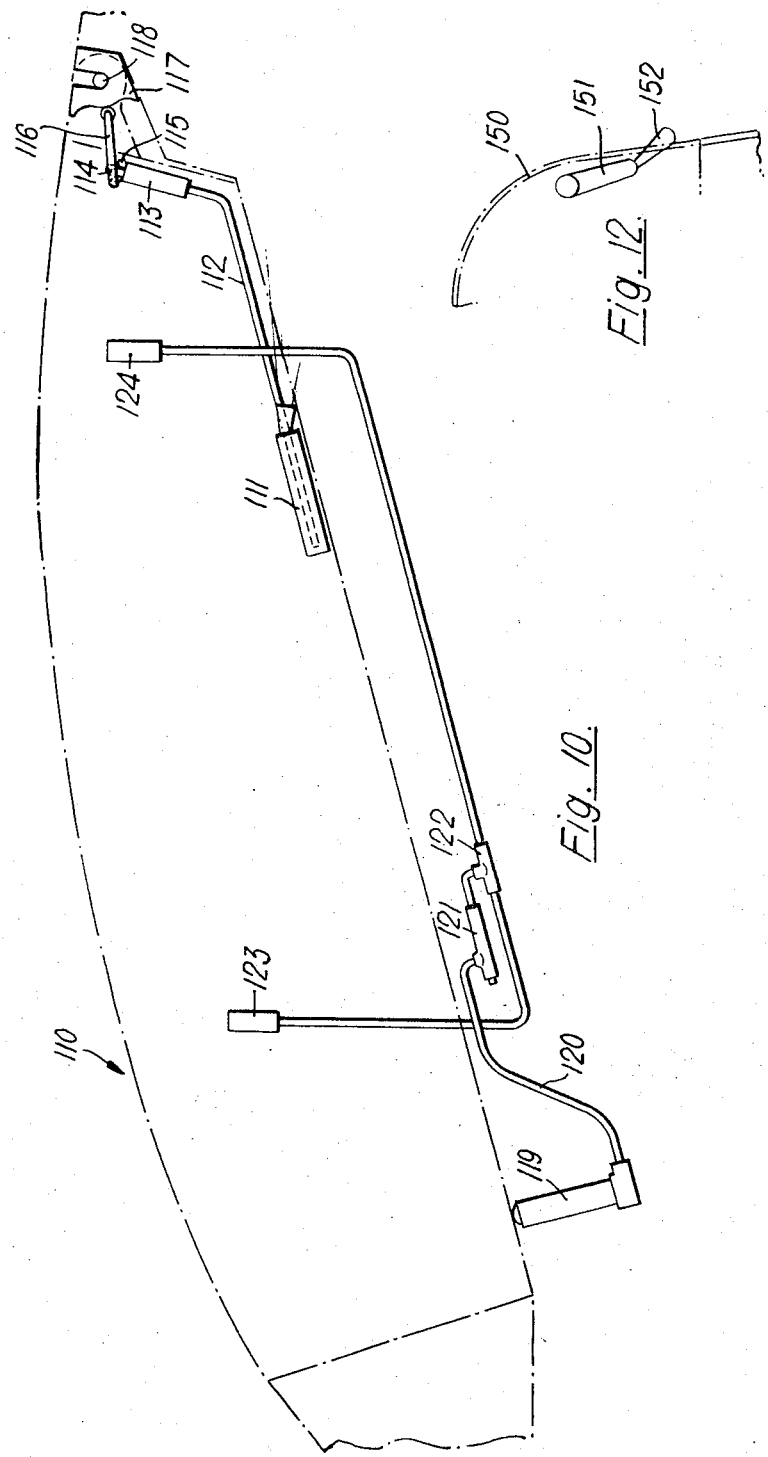

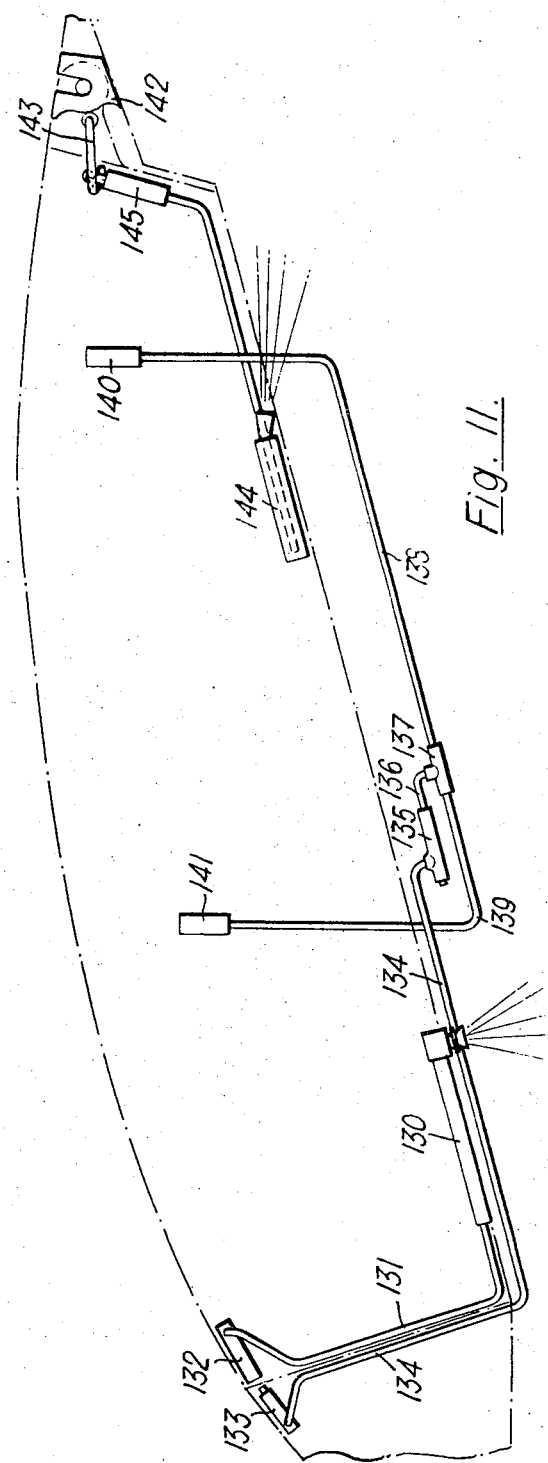

MECHANISM FOR THE EMERGENCY OPENING OR JETTISONING OF THE HOODS OR CANOPIES OF VEHICLES

This invention concerns mechanisms for the emergency opening of the hoods or canopies of vehicles such as, for example, those provided on aircraft or spacecraft, all hereinafter, for the sake of convenience, referred to as "aircraft."

I have proposed a mechanism for jettisoning the hoods or canopies of aircraft comprising jack pistons working in cylinders and actuated by pressure fluid, means common to all the jack pistons and cylinders for generating a supply of pressure fluid, pipe lines leading from said generating means to said cylinders, and means also actuated by the pressure fluid for releasing the hood or canoy latch locks, the mechanism being so actuated by the pressure fluid that the latch locks are first released and thereafter the jack pistons jettison the hood or canopy.

With the advent of vertical take-off aircraft with a capability of hovering, the use of jack pistons to open or jettison hoods or canopies in an emergency has not proved altogether satisfactory at least when emergency opening or jettisoning of such canopies takes place at a time when the aircraft is hovering as there is a tendency for the opened or jettisoned canopy to remain in the path of the ejection seat(s) of the aircraft for a sufficiently long period of time to produce a risk of collision of the ejection seat(s) with the canopy especially if the ejection of the seat(s) takes place almost simultaneously with jettisoning of the canopy.

Tests have shown that increasing the strokes of the jack pistons does not overcome this difficulty as, whilst the canopy is lifted higher, it nevertheless follows a similar trajectory and remains in the path of the ejection seat for too great a period of time. Still further relocation of the position of the jack pistons does not provide a solution to the problem and such re-location of the jack pistons merely causes the canopy to spin.

One object of the invention is to provide a mechanism at least for opening (and in certain instances additionally jettisoning) the canopy of a vehicle (for example an aircraft) in an emergency which obviates the aforementioned disadvantages. Another object of the invention is to provide, in combination, an ejection seat/aircraft canopy opening or jettisoning mechanism having an improved capability of saving an airman's life when he ejects from a hovering aircraft.

Thus according to one aspect of this invention there is provided a vehicle emergency cockpit canopy opening or jettisoning mechanism comprising release means for unlocking at least a part of the canopy from a vehicle provided with the canopy and at least one primary rocket motor to thrust the canopy in a direction away from its normal position on the vehicle.

The invention may be applied to many different types of canopy such as, for example, those normally hingedly connected to the side of, or to the rear of, the cockpit in addition to canopies which slide into an open position by rearward movement substantially longitudinally of the cockpit.

According to one feature of the invention additional means may be provided initially to separate the canopy from the vehicle prior to initiation of the rocket motor and very conveniently such additional means may comprise a supplementary rocket motor or alternatively said rocket motor may be used in combination with a system of ballistic jacks of the kind already proposed and referred to hereinbefore.

Expediently the means for initiating operation of the canopy opening or jettisoning mechanism may be operatively connected to an ejection seat firing initiator so that initial movement of such ejection seat firing initiator first initiates the canopy opening or jettisoning mechanism.

The canopy opening or jettisoning mechanism may be arranged to initiate ejection of an ejection seat after the canopy is positioned outside the ejection seat ejection trajectory. Such latter arrangement is not always however desirable and a preferred arrangement is to provide an interdictor coupled to the canopy in a manner to sense the position of the canopy so that the interdictor is only removed, and the ejection seat is only free to be ejected, when the canopy is in an emergency open position outside the ejection trajectory of the ejection seat.

Preferably a gas generator, conveniently in the form of at least one ballistic cartridge, causes movement of said release means and firing of said primary rocket motor and also firing of said secondary motor or ballistic jack when one or other of the latter are provided.

Desirably more than one gas generator may be used and such gas generators may expediently be sequentially actuated.

Whilst in certain applications one primary rocket motor may be sufficient it is expected that in other applications at least two or more primary motors will be used. In one particular embodiment of the invention two rocket primary rocket motors and two supplementary rocket motors are utilised, such supplementary rocket motors being orientated to thrust the canopy in a first direction and the primary motors being orientated to thrust the canopy in a different direction.

Said canopy opening or jettisoning mechanism may be constructed so that it is effective irrespective of whether the canopy is closed or whether it is in its normal open position or whether it is in a position intermediate said closed and normal open positions.

According to another aspect of this invention there is provided a vehicle emergency cockpit canopy opening or jettisoning mechanism suitable for a canopy which is normally moved slidingly with respect to its cockpit to open and close the latter, said canopy being provided with a lock normally to retain the canopy in a cockpit closing position, said mechanism comprising a primary rocket motor, a main lay shaft operatively connected to lock release means and to primary rocket motor initiator means via time delay means, gas powered means for moving said lay shaft about its axis, initiation of said gas powered means causing movement of said lay shaft to cause the canopy to be unlocked and thereafter to cause initiation of said rocket motor.

According to a further aspect of the invention there is provided a vehicle emergency cockpit canopy opening or jettisoning mechanism suitable for a canopy which is normally moved from a closed to an open position in an arc about a side hinge line, said canopy being provided with a lock normally to retain the canopy in a cockpit closing position, said mechanism comprising a primary rocket motor, a main lay shaft operatively connected to lock release means and to primary rocket motor initiator means, gas powered means for moving said lay shaft about its axis, a lockable telescopic strut provided normally to prevent movement of the canopy from a closed position beyond a normal open position, means operable to permit the strut to allow passage of said canopy beyond said normal open position to an emergency open position and strut locking means to prevent collapse of said strut once said emergency position is reached.

According to a still further aspect of the invention there is provided a vehicle emergency cockpit canopy opening or jettisoning mechanism suitable for a canopy which is normally moved from a closed position to an open position in an arc about a rear hinge line, said canopy being provided with a lock normally to retain the canopy in a cockpit closing position, said mechanism comprising a primary rocket motor, a primary rocket motor initiating means to cause initiation of rocket motor transmission means to transmit movement of the cockpit from an open position to an emergency open position to said initiating means, and an initiator device movable with the canopy to engage said transmission means when the cockpit canopy passes said normally open position, additional means also being provided initially to separate the canopy from the vehicle prior to initiation of the rocket motor.

It will be understood that whilst the rocket motor(s) may be provided on the exterior of the canopy, desirably the motor(s) is located in a pressurised area within the cockpit with its exhaust nozzle passing through the canopy to the outside thereof.

According to yet another aspect of the invention there is provided a vehicle having a cockpit and a canopy for closing said cockpit, said vehicle and canopy being provided with a vehicle emergency cockpit canopy opening or jettisoning mechanism comprising release means for unlocking at least a part of the canopy from a vehicle provided with the canopy and at least one primary rocket motor to thrust the canopy in a direction away from its normal position on the vehicle.

In order that the invention may be more readily understood certain particular embodiments of the emergency canopy opening and jettisoning mechanisms will now be described by way of example and with reference to the accompanying diagramatic drawings in which:

FIG. 4 is a fragmentary diagrammatic perspective view of a second aircraft cockpit having an emergency canopy opening mechanism according to this invention, this canopy being hinged along one of its sides;

FIG. 5 is a diagrammatic transverse cross sectional view through the canopy in a closed position;

FIG. 6 is a view similar to FIG. 5 but showing the canopy in a normal open position and also in an emergency open position;

FIG. 7 is a fragmentary longitudinal sectional view through a telescopic strut which is adapted to extend from the canopy to aircraft structure surrounding the canopy;

FIG. 8 is a fragmentary view of linkage associated with a hinge of the canopy; and FIG. 9 is a further fragmentary view of linkage of the mechanism, this linkage being associated with a safety stop;

Figure 1:
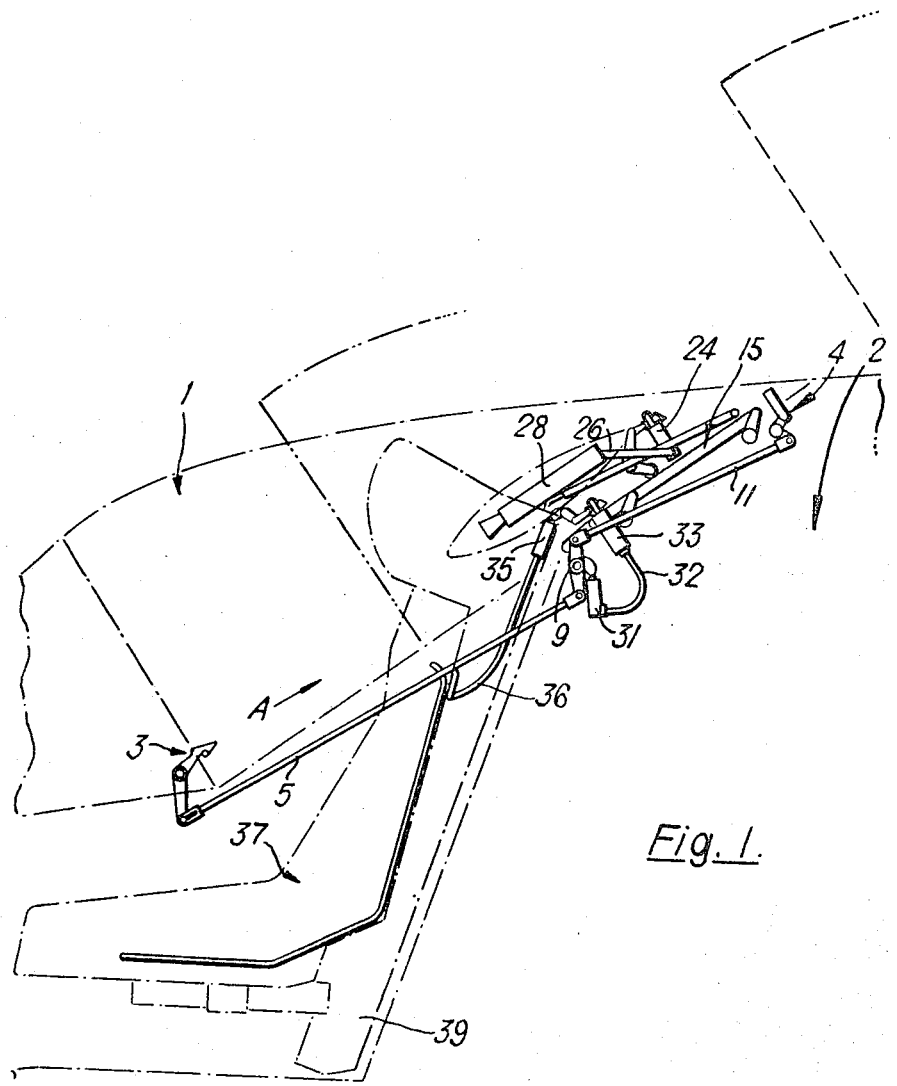
FIG. 1 is a diagrammatic side elevational view of an aircraft cockpit housing an ejection seat and being closed by a normally rearwardly slidable canopy, such canopy being provided with emergency canopy jettisoning mechanism according to this invention.

FIGS. 10 and 11 are diagrammatic fragmentary side elevational view of two further forms of emergency jettisoning mechanism according to the invention, FIG. 10 showing the mechanism being associated with a ballistic jack of a known form and both canopies having their rear edge portion normally hingedly connected to the aircraft; and FIG. 12 is a diagrammatic view showing how a rocket motor may be located within the cockpit but which has its exhaust nozzle(s) extending to the outside of the canopy.

In a first embodiment the mechanism is provided to jettison completely a canopy 1 which rides in rails (not shown) on a canopy frame (not shown). The canopy is of the kind which is normally opened by rearward sliding movement thereof on the frame in a direction substantially longitudinally of the aircraft generally designated 2.

Aircraft 2 with canopies 1 of this kind are provided with locks 3 towards the front of the cockpit to retain the canopy 1 in a closed position over the cockpit and further with a stop 4 to limit the extent of rearward sliding movement in the direction of arrow A permitted when opening the canopy 1 in normal conditions to gain access to, or to leave, the aircraft cockpit.

The locks 3 are generally connected to a release lever (not shown) movable by the pilot when he wishes to open the canopy 1.

In this embodiment these locks 3, one of which is positioned on each side of the canopy 1, are respectively pivotally connected additionally to first and second connecting links 5, 6 which extend parallel to the sides of the canopy and are each connected to a corresponding web respectively designated 7, 8 carried by a transverse lay shaft 9 supported so that it may rock about its own axis. The arrangement is such that rocking of this lay shaft moves the connecting links 5, 6 causing simultaneous movement of the canopy locks.

The lay shaft 9 carries a third web 10 which is pivotally connected to a third connecting link 11 which is in turn pivotally connected via a bell crank lever 12 to the said canopy stop 4, the arrangement being such that when the lay shaft is rocked in a sense to unlock the canopy locks 3 the stop will simultaneously be withdrawn and will be rendered ineffective.

Said lay shaft 9 further carries a pair of radially directed flanges 13 between which a slotted link 14 is pivotally retained, this slotted link 14 in turn being connected to a parallel linkage assembly generally designated 15. This assembly comprises a transmission shaft 16 supported for longitudinal movement on angularly movable legs 17 so that, when the lay shaft is rotated to unlock the locks 3, i.e. in the direction of arrow B, the transmission shaft 16 moves both longitudinally and upwardly, the upward movement stemming from the provision of the legs 17. Slot 18 in the link 14 is provided so as to permit limited rotary movement of the lay shaft 9 to occur to unlock the locks 3 and withdraw the stop 4 before movement of the transmission shaft takes place.

Mounted above the transmission shaft 16 is a second lay shaft 19 carrying at one end a dependent roller 20 which engages the transmission shaft 16, and at the other end a flange 21 which pivotally carries a sear 22.

This sear is located in a spring biassed firing pin 23 of a pressure fluid (for example gas) generator 24. Such generator 24 which houses a ballistic cartridge has a pair of pressure fluid outlets 25, 26 each coupled respectively to an initiator 27 of a rocket motor 28. The two rocket motors 28 are carried by the canopy and have thrust lines which are parallel to one another and which are also parallel to the direction of opening movement of the canopy 1.

An additional lever 29 extends radially from said first lay shaft 9 and the extremity of this lever is engaged by a piston 30 of a piston and cylinder assembly 31. The base of this assembly is connected, by a conduit 32, to another pressure fluid (gas) generator 33. This generator 33 is initiated by any appropriate means (for example by mechanical linkage generally designated 34 and a piston and cylinder assembly 35) in response to initial movement of the ejection seat firing mechanism. In this embodiment such ejection seat firing mechanism causes gas under pressure to travel along conduit 36 to the assembly 35.

Figure 2:
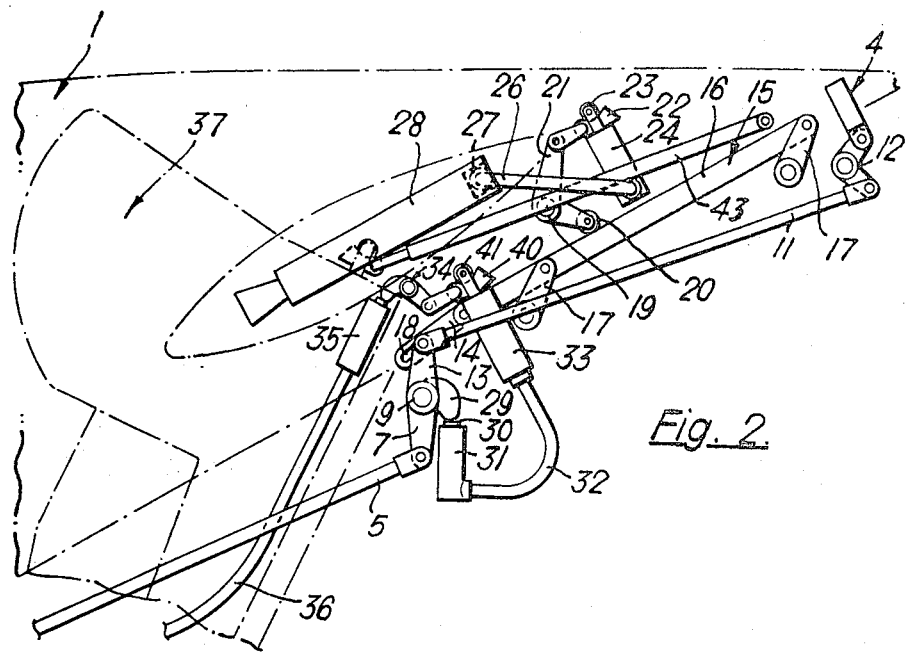
FIG. 2 is an enlarged elevational view of the mechanism of FIG. 1.
Figure 3:
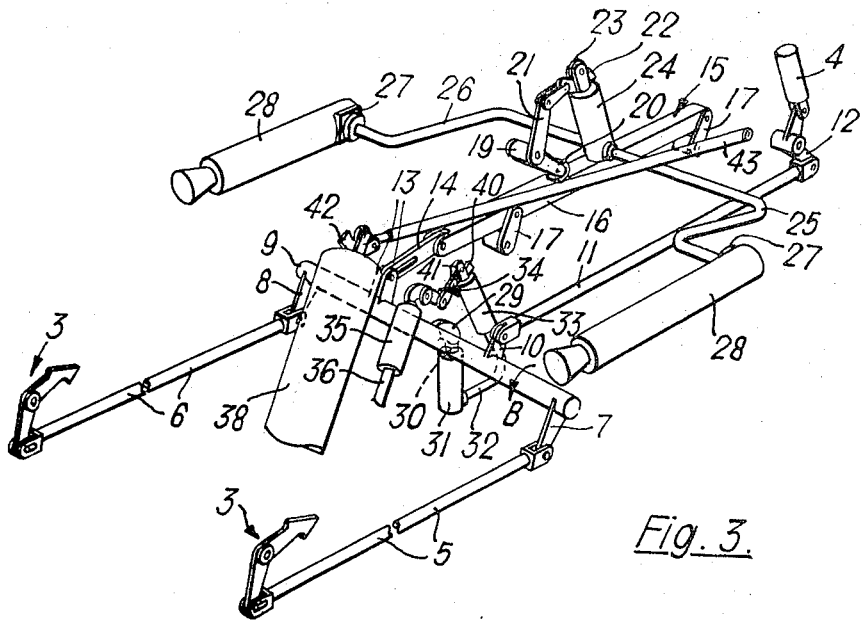
FIG. 3 is a perspective view of the mechanism of FIGS. 1 and 2.

In FIGS. 1, 2 and 3 an ejection seat is shown, being generally designated 37 and having a standard ejection gun 38 extending up the back of the seat between beams 39.

When such ejection seat firing mechanism is actuated the piston of the assembly 35 moves linkage 34 and the gas generator 33 is initiated by withdrawal of a sear 40 therefrom, this movement of sear 40 resulting in the stressing of a spring biassed firing pin 41 which, when the sear 40 is fully withdrawn, is released and a cartridge in the generator 33 is fired, gas generated thereby flowing into the cylinder of the assembly 31 so that the piston 30 is moved and said lever 29 is moved. This results in rotation of the first lay shaft 9 in the direction of arrow B. Rocking of this lay shaft 9 first imparts a movement to the three connecting links 5, 6 and 11 causing unlocking of the locks 3 and withdrawing of the stop 4.

Once rotation of the lay shaft has been sufficient to take up the lost motion provided by said slot 18 in link 14, continued rocking causes longitudinal movement of the transmission shaft 16 with the result that the shaft moves upwardly, lifts the roller 20 with the result that the second lay shaft 19 rotates and the flange 21 formed thereon causes withdrawal of the sear 22 from the fluid pressure (gas) generator 24 which is coupled to the rocket motor initiators 27. The rocket motors 28 are thus initiated and the canopy is thrust rearwardly out of the path of the ejection seat so that ejection of the seat 37 can take place.

An additional lost motion provision is made in the linkage of the canopy locks to enable the canopy to be opened in normal circumstances without affecting the rocket emergency opening assembly.

The transmission shaft 16 is provided with angularly movable legs 17 so that a parallel motion construction is provided so that the jettisoning assembly is effective even when jettisoning of the canopy occurs when the canopy 1 is in a partially or fully, open position.

Actual ejection of the seat 37 would normally be initiated by withdrawal of a sear from the firing mechanism of the ejection seat gun 38 after removal of a safety sear 42 attached to a telescopic link or static line designated 43 attached to the canopy 1. The telescopic link or static line 43 would be selected to be of a length sufficient to ensure that removal of the safety sear 42 does not occur until the canopy is displaced into a position clear of the path of the ejection seat 37.

If deemed desirable the canopy 1 may additionally be arranged to be initially moved from its position on the aircraft by means of the usual ballistic jacks.

In a second embodiment the mechanism is provided to open (beyond its normal open position) a canopy 50 which is normally hingedly connected to one side of the aircraft cockpit. In this particular embodiment provision is not made wholly to jettison the canopy 50 but such provision could, of course, be made.

Side hinged cockpit canopies 50 of this kind are provided with locks 51 to retain the cockpit closed and a control handle 52 is provided to enable the pilot to open the canopy.

These locks are in the form of a pair of lock levers 53 intercoupled by a link 54, this link extending longitudinally of the aircraft and being connected via a cable 55 to said control handle 52.

In this embodiment lost motion provisions (slots 56) are made to enable the levers 53 of the locks 51 to be moved by a separate connecting link 57 forming part of the emergency canopy opening mechanism according to this invention.

This connecting link 57 is coupled to a first lever 58 radially disposed on an end portion of a main lay shaft 59 extending transversely of the aircraft at the rear of the cockpit. This main lay shaft 59 is supported for rotary movement and carries, substantially centrally, a radially disposed arm 60, the extremity thereof being engaged by the piston 61 of a secondary piston and cylinder assembly 62 which is in turn coupled by a conduit 63 to a secondary pressure fluid (gas) generator 64, this secondary generator 64 being fired by withdrawal of a sear 65 which is coupled, by linkage 66, to a primary piston and cylinder assembly 67. This primary assembly 67 is coupled by a conduit 68 to a primary pressure fluid (gas) generator (not shown) on an ejection seat.

Positioned above the transverse main lay shaft 59 is a telescopic strut 70 which serves to limit the extent of opening of the canopy normally permitted. This strut 70 is provided with a transverse spring biassed strut length-limiting pin 71 which prevents an inner portion 72 of the strut being withdrawn wholly from the outer portion 73. This pin 71 whilst being biassed by spring 74 towards a position where it is effective is also movable to an ineffective position in response to movement of a sear 75 which is coupled by a link 76, via a bell crank lever 77 and a further link 78, to a lever 79 extending radially from the main lay shaft 59. Thus, when the pin is ineffective the canopy may be opened to a position outside its normal open position hereinafter referred to as the emergency open position. The closed, normal open and emergency positions of the canopy 50 are shown in FIGS. 5 and 6 of the accompanying drawings. The strut is also shown in detail in FIG. 7.

A plunger 80 is also provided on the telescopic strut 70 which is biassed by spring 81 inwardly of the strut and which serves to retain the strut 70 in a fully extended position once such emergency open position has been reached.

Yet another lever designated 82 is provided on the main lay shaft 59 adjacent the said link 79 and this lever 82 is pivotally connected to a bifurcated plunger 83, the bifurcations 84 of the plunger being slotted at 85 to provide lost motion. The plunger engages one arm 86 of a bell crank lever 87 and the other arm 88 of such bell crank lever is coupled to a sear link 89 of a pressure fluid (gas) generator 90 which is coupled by conduit 91 to a rocket motor 92 positioned with its outlet nozzle on the outer surface of the canopy 50 above the said canopy locks 51. The thrust line of the rocket motor 92 is directed downwardly and outwardly so that when the rocket is fired it moves the canopy 50 away from the locks and in an arc about the hinged connection of the canopy 50 to the aircraft.

An initiating lever 93 movable with the canopy 50 is provided on the hinged side of the canopy 50. Terminating adjacent this lever 93 is an end portion of the initiating linkage 94 for the gun of the ejection seat. The arrangement is such that when the canopy is in any position between the normally open or closed positions, the lever 93 does not contact the ejection seat firing linkage 94. However, when the canopy passes the normal position (only permitted when the spring biassed stop pin 71 is withdrawn) the lever 93 engages the firing linkage 94 and a sear 95 of the ejection seat gun 96 is withdrawn and the gun 96 is fired. Such linkage 94 merely comprises a series of links 97, 98 and 99 pivotally interconnected by a shaft 100.

To ensure that accidental firing of the seat gun 96 does not take place, say for example, due to failure of the stop pin 71, a safety pin 101 is located to prevent, in such an instance, movement of the ejection gun firing linkage 94. However, this pin is coupled via an L-shaped lever 102 and appropriate links 103 to a radially directed flange 104 carried by the main lay shaft 59.

In an emergency the following steps occur.

Actuation of the ejection firing mechanism (not shown) on the ejection seat causes withdrawl of the sear from the primary generator (not shown), movement of the piston from the cylinder of the primary assembly 67, removal of the sear 65 from the secondary generator 64 and movement of the piston 61 out of the cylinder of the secondary assembly 62. Such movement results in movement of the centrally disposed radial arm 60. This movement results in rotation of the main lay shaft in the direction of arrow C.

As a result of such movement firstly the canopy locks 51 are released and simultaneously the strut length-limiting pin 71 is withdrawn. Additionally the safety pin 101 is withdrawn from the ejection gun firing linkage 94 adjacent the initiating lever 93. Furthermore after a slight delay caused by slot 85 the pressure fluid (gas) generator 90 coupled to the rocket motor 92 is fired as a result of its sear 89 being withdrawn by movement of the plunger 83 in response to continued movement of the lay shaft 59. The rocket motor 92 is thus fired and the canopy is moved from its closed position E in an arc about its hinges in the direction of arrow D and past its normal open position F (the strut length-limiting pin 71 being ineffective). Once past the normal open position F in to the emergency open position G the plunger 80 prevents subsequent collapse of the strut 70 and thus reclosing of the canopy 50 is prevented.

When this position is reached (namely when the canopy is outside the ejection seat path) the initiating lever 93 on the canopy 50 strikes the ejection seat gun initiating linkage 94 and the seat gun is fired with the result that the seat is ejected from the aircraft.

It is to be noted that whilst in the first embodiment described with reference to FIGS. 1 to 3 the canopy is completely jettisoned and not merely opened, in the second embodiment described with reference to FIGS. 4 to 9 the canopy is merely opened past its normal open position F to an emergency open position G and remains coupled to the aircraft. However as stated hereinbefore provision could be made for jettisoning the hinged canopy 50 completely and this may be arranged by providing hinges which disconnect when the canopy reaches the emergency open position G and by additionally providing means to disconnect the telescopic strut 70. In such an arrangement an additional rocket motor could be provided to thrust the released canopy 50 further from the aircraft.

It will be understood that the invention could equally well be applied to a front opening canopy which is hinged on a transverse hinge line behind the cockpit.

With a front opening canopy which is hinged on a line extending transversely of the aircraft and behind the aircraft cockpit it is not normally feasible merely to open the cockpit of the aircraft whilst the latter is in flight passed and it is necessary to jettison the canopy completely from the aircraft.

In one embodiment shown in FIG. 10 the canopy 110 is provided, on opposite sides thereof and towards the rear thereof, with rocket motors 111 having thrust lines which are forwardly directed and extend substantially parallel to the general longitudinal axis of the aircraft fuselage. Such rocket motors 111 are each respectively connected by means of conduits 112 to a pressure fluid (gas) generator 113 situated towards the rear of the cockpit, such generator 113 housing a cartridge for producing the pressure fluid. Such cartridge is arranged to be initiated by means of a spring biassed firing pin 114 which is first stressed and released by means of a forwardly withdrawable sear 115. This sear 115 is coupled to an operating rod 116 which is dimensioned so that a terminal portion thereof will be engaged by a protuberance 117 carried on the canopy hinge 118 when the canopy is moved passed a predetermined position. Movement of the canopy 110 passed such position results in movement of the protruberance 117 and withdrawal of the sear 115 and thus initiation of the gas generator 113.

Initiation of the generator 113 results in pressure fluid being discharged from the generator and into the conduits 112 with the result that the initiators of the rocket motors are operated and the rocket motors fire.

In operation it is merely necessary for the canopy to be jettisoned by actuation of, for example, any known proposed unlocking mechanism and ballistic jack arrangement referred to hereinbefore which results in the front of the canopy 110 being lifted from the normal closed position (the jacks 119 being positioned towards the front of the canopy) through an angle of 90° or more until the canopy reaches said predetermined position. At this time such pivotable movement of the canopy 110 about its hinge line results in movement of the protruberance 117 and energisation of the rocket motors 111, as hereinbefore described.

One jack 110 is, for the sake of explanation, shown in FIG. 10 and is coupled in a known fashion by a conduit 120 to connectors 121 and 122 which are connected to two gas generators 123 and 124 so that initiation of either of these generators will cause actuation of the jacks 119. The connector 121 is in the form of a piston and cylinder assembly or shuttle valve which is mechanically linked to the canopy locks (not shown), pressure fluid from either or both of the generators 123 and 124 causing movement of the piston of the connector 121 and consequential unlocking of the canopy locks. Until the piston has been moved by such pressure fluid and the canopy unlocked, pressure fluid may not pass into the conduit 120 to cause firing of the jacks 119.

It will be understood that at the time of initiation of the rocket motors 111 the canopy will have moved under the influence of jacks 119 through an angle of about 90° and will be about to become inverted so that the thrust lines of the rocket motors 111 will be upwardly and rearwardly directed. These rocket motors 111 will thus, once energised, thrust the canopy in an upward and rearward direction. The angular relationship between the protuberance 117 and the canopy will be such that the initiation of the rocket motors will occur at a position where the thrust lines of the rocket motors will be orientated to provide an optimum trajectory for moving the canopy 110 both out of the ejection seat ejection path and additionally into a position where it will not be struck by the tail fin(s) of the aircraft from which jettisoning is taking place.

The hinge(s) between the canopy and the aircraft will be such that they will disconnect the canopy 110 from the aircraft on engagement of the abutment 117 with the operating rod 116.

In another embodiment the use of ballistic jacks such as those designated 119 towards the front of the cockpit canopy 110 is avoided and the initial stages of jettisoning of the canopy is effected by the use of one or more supplementary rocket motors which replace the said jacks.

In such an embodiment, shown in FIG. 11, a pair of rocket motors 130 are located towards the front of the cockpit canopy, one motor being positioned on each side of the canopy with its thrust line directed substantially upwardly; that is substantially at right angles to the longitudinal axis of the aircraft fuselage or at least substantially at right angles to the join line of the canopy and to the aircraft fuselage in the vicinity of the rocket motors.

Each of such rocket motors 130 is connected, by means of a respective conduit 131, to a pressure fluid (gas) generator 132 again conveniently in the form of a unit housing a gas generating cartridge. This generator 132 is situated so that its initiator for firing the cartridge therein lies adjacent the join line between the canopy 130 and the front of the cockpit and furthermore lies opposite a piston and cylinder assembly 133 carried by the aircraft structure. This assembly 133 is in turn connected by means of further conduit 134 to a by-pass or shuttle valve 135 positioned on the aircraft. This valve is in turn connected, by a further length of conduit 136 to a T-piece 137 from which two lengths of conduit 138 and 139 extend respectively to first and second fluid pressure (gas) generators 140 and 141 provided in the aircraft cockpit. Said by-pass valve 135 is provided to permit the flow of pressure fluid to the piston and cylinder assembly 133 only after associated mechanism has been effective to release the usual canopy locks thereby to ensure that the rocket motors are not initiated before unlocking of the canopy. This arrangement has already been described with reference to FIG. 10.

The first generator 140 is operatively coupled to the ejection seat firing mechanism and the second generator is coupled to a separate control normally provided in an aircraft cockpit (independent of the ejection seat) for jettisoning of the canopy without causing ejection.

The arrangement is such that actuation of either of the first and second gas generators respectively in response to movement by the airman of the canopy jettisoning handle or initial movement of the ejection seat firing handle causes gas pressure to flow towards the T-piece 137 and into the by-pass valve 135. Such by-pass valve first causes or senses that mechanism associated with the canopy locks is or has operated so that the locks are opened and then permits pressure fluid to pass along the conduits 134 to said piston and cylinder assembly 133. The piston of the assembly is moved (in response to said pressure fluid) in a direction out of its cylinder towards the initiator of the gas generator 132 provided on the front of the canopy 110. This movement of said piston causes movement of the generator initiator and pressure fluid is thus generated and such fluid (gas) passes through conduits 131 to the initiator mechanisms of the two rocket motors 130 positioned on opposite sides of the canopy.

The said rocket motors are thus fired and the forward portion of the canopy is lifted in an arc about the canopy hinge line whereupon an abutment 142 engages an operating rod 143, the canopy hinge(s) disconnects the rocket motors 144 are fired by generators 145 so that the canopy is removed well away from the ejection seat ejection trajectory.

Means would be provided to ensure that the ejection seat cannot be ejected until the canopy is outside the ejection trajectory. Such means may comprise a lanyard coupled to the canopy and also coupled to an interdictor or safety sear provided in the seat gun firing mechanism.

FIG. 12 is included in the drawings merely to indicate that conveniently the rocket motor(s) would be positioned within the canopy in practice. In FIG. 12 a canopy 150, internally located rocket motor 151 and externally located nozzle 152 are depicted.

I claim:

1. A vehicle emergency cockpit canopy opening or jettisoning mechanism for a cockpit canopy movable between an open and a closed position on the vehicle, comprising locking means for locking the canopy in the closed position, release means for unlocking the locking means, a primary rocket motor mounted on the canopy to thrust the canopy in a direction away from its normal position on the vehicle; a primary rocket initiating means to cause initiation of the primary rocket motor; and transmission means to transmit the unlocking movement of the release means to the initiating means of the primary rocket motor.

2. A mechanism according to claim 1, wherein such primary motor has an exhaust nozzle and said motor is located within the canopy but the exhaust nozzle extending to the exterior of the canopy.

3. A mechanism according to claim 1, wherein additional means are provided initially to operate the release means prior to initiation of said primary rocket motor.

4. A mechanism according to claim 1, comprising at least one ballistic jack to separate the canopy from the vehicle prior to initiation of the primary rocket motor.

5. A mechanism according to claim 1, comprising at least one supplementary rocket motor to separate the canopy from the vehicle prior to initiation of the primary rocket motor.

6. A mechanism according to claim 1, wherein initiator means are provided to actuate said release means and said primary rocket motor sequentially.

7. A mechanism according to claim 6, wherein at least one gas generator constitutes said initiator means.

8. A mechanism according to claim 1, wherein at least two primary rocket motors are provided.

9. A mechanism according to claim 4, wherein at least two ballistic jacks are provided.

10. A mechanism according to claim 5, wherein at least two supplementary rocket motors are provided.

11. A mechanism according to claim 6, further comprising an ejection seat in the vehicle, ejection seat initiator means, and an ejection seat firing mechanism interdictor, the initiator means and the interdictor being coupled together so that the ejection seat will be ejected from the vehicle only after emergency opening or jettisoning of the canopy by the mechanism.

12. A mechanism according to claim 1, including additional means for initially separating the canopy from the vehicle after release of said lock but before initiation of said primary rocket motor.

13. A mechanism according to claim 1, in which an ejection seat is positioned within said cockpit beneath said canopy when the latter is closed and wherein an ejection gun firing mechanism of said seat is coupled to said emergency cockpit canopy opening or jettisoning mechanism.

14. A vehicle emergency cockpit canopy opening or jettisoning mechanism suitable for a canopy which is normally moved from a closed position to an open position in an arc about a rear hinge line, said canopy being provided with a lock normally to retain the canopy in a cockpit closing position, said mechanism comprising a primary rocket motor mounted on the canopy, a primary rocket motor initiating means to cause initiation of the rocket motor; transmission means to transmit movement of the cockpit canopy from an open position to an emergency open position to said initiating means; and an initiator device movable with the canopy to engage said transmission means when the cockpit canopy passes said normally open position; additional means also being provided initially to separate the canopy from the vehicle prior to initiation of the rocket motor.

15. A mechanism according to claim 14, wherein said additional means comprise at least one ballistic jack; a gas generator, the gas from which initiates said jack; said gas under pressure also serving to cause unlocking of the canopy lock; a shuttle valve preventing passage of the gas under pressure from the unit to the ballistic jack until said lock has been released.

16. A mechanism according to claim 14, wherein said additional means comprise at least one supplementary rocket motor and a gas generator the rocket motor being initiated by gas pressure generated by a gas generator unit, said gas generator unit being initiated by movement of a piston from a piston and cylinder assembly under the influence of gas generated by a further gas generator unit, said gas from said further unit passing to the piston and cylinder assembly via a shuttle valve which prevents passge of said gas to the piston cylinder assembly until the canopy lock has been unlocked, which gas under pressure serves also to unlock said canopy lock.

17. A vehicle emergency cockpit canopy opening or jettisoning mechanism for a cockpit canopy movable with respect to the cockpit between an open and closed position, comprising a lock for locking the canopy in the closed position, a primary rocket motor mounted on the canopy to thrust the canopy away from its normal position on the vehicle; a main lay shaft; lock release means; primary rocket motor initiator means; time delay means; gas powered means for moving said say shaft about its axis; said shaft being operatively connected between the release means and the initiator means via the time delay means so that initiation of said gas powered means results in movement of said lay shaft to cause the canopy to be unlocked and thereafter to cause initiation of said rocket motor.

18. A mechanism according to claim 17, wherein a slotted link constitutes said time delay mechanism, this link being pivotally coupled to said lay shaft and also to a longitudinally and transversely movable transmission shaft, cam means transmitting movement of such transmission shaft to said primary rocket motor initiator means.

19. A mechanism according to claim 18, wherein the primary rocket motor, said initiator means and said cam means are movable as an assembly with the canopy but with respect to the transmission shaft and lay shaft.

20. A mechanism according to claim 19, wherein a linkage which is adapted to control movement of a stop provided normally to prevent movement of the canopy beyond a normal open position is coupled to said lay shaft.

21. A vehicle emergency cockpit canopy opening or jettisoning mechanism for a cockpit canopy movable between a closed and an open position in an arc about a side hinge line, comprising a lock for locking the canopy in the closed position, a primary rocket motor mounted on the canopy to thrust the canopy in a direction away from its normal position on the vehicle; a main lay shaft; lock release means; primary rocket motor initiator means; gas powered means for moving said lay shaft about its axis; a lockable telescopic strut provided normally to prevent movement of the canopy from the closed position beyond a open position; means operable to permit the strut to allow passage of said canopy beyond said normal open position to an emergency open position; and strut locking means to prevent collapse of said strut once said emergency open position is reached, said shaft being operatively connected to the lock release means and to the primary rocket motor initiator means to transmit the unlocking movement of the release means to the primary rocket motor initiator means.

22. A mechanism according to claim 21, wherein an initiator device is provided and is movable with the canopy, movement of the canopy to said emergency open position being transmitted to the initiator device, said initiator device being adapted to be coupled to an ejection seat firing mechanism interdictor thereby automatically to cause, or to permit, initiation of an ejection seat when said canopy reaches said emergency open position.

23. A mechanism according to claim 22, wherein a safety catch operatively connected to the lay shaft is provided to prevent actuation of the ejection seat firing mechanism until after said lay shaft is moved in a sense to cause initiation of the primary rocket motor by said gas powered means.

* * * * *